United States Patent

Wright

[11] 4,102,224
[45] Jul. 25, 1978

[54] GRINDING MACHINE WITH MEANS FOR ADVANCING A SAW

[76] Inventor: James L. Wright, 81085 N. Beech Rd., Creswell, Oreg. 97426

[21] Appl. No.: 785,194

[22] Filed: Apr. 6, 1977

[51] Int. Cl.² ............................................. B23D 47/04
[52] U.S. Cl. .................................. 76/79; 51/216 ND; 51/225; 74/128
[58] Field of Search ................... 76/37, 41, 75, 40, 76, 76/34, 35, 77, 79, 78 R; 51/225, 216 ND; 74/128, 813 R

[56] References Cited

U.S. PATENT DOCUMENTS 3,304,660  2/1967  Bindszus ............................... 51/225

FOREIGN PATENT DOCUMENTS 479,855  4/1953  Italy ........................................ 76/40

Primary Examiner—Harold D. Whitehead
Assistant Examiner—Roscoe V. Parker
Attorney, Agent, or Firm—Kolisch, Hartwell, Dickinson & Stuart

[57] ABSTRACT

A grinding machine for grinding teeth in a saw including saw advancing means having clamp mechanism for engaging a saw. The clamp mechanism is then moved to rotate the saw past an indexing means, which is followed by movement in the opposite direction to position the saw.

7 Claims, 4 Drawing Figures

GRINDING MACHINE WITH MEANS FOR ADVANCING A SAW

This invention relates to grinders or grinding machines adapted for use in the grinding of the teeth in a saw, and more particularly to a grinding machine of this description having means for positioning a tooth in a saw whereby such becomes properly located for a grinding operation subsequently performed thereon.

Various types of grinders have been proposed for the sharpening of teeth in a saw, such as a circular saw. It is usual in such grinding eqipment to mount the saw on a rotatable mounting, and to rotate the saw in increments to bring successive teeth into the sharpening station of the grinding machine. Obviously, if optimum grinding of a tooth is to be performed, it is a requirement that each time a tooth is moved into the sharpening station of a grinding machine, the tooth must be precisely positioned in such station. If a tooth is even slightly out of position, when the grinding wheel or wheels which produce the sharpening moves across the tooth, the path of the wheel across the tooth is different than with other teeth in the saw, with the tooth having after grinding a configuration slightly different from other teeth. This, of course, is highly disadvantageous.

Conventional grinders usually have relied upon an advancing element which is extended a predetermined amount to move a tooth that it has engaged into the sharpening station of the grinding machine. This approach has certain drawbacks, since the tooth is not positively located by such an element, the amount that the element extends over repeated actuations being subject to some variation. Furthermore, this type of equipment does not readily accommodate different configurations of teeth and different radii of saws. For instance, with some teeth configurations there is not proper clearance for the element to move out and engage the tooth. As another example, a saw with one type of hook angle in the tooth thereof will tend to be positioned by such an element somewhat differently than a saw having teeth characterized by another hook angle.

The general object of this invention is to provide an improved grinding machine having means for advancing successive teeth into a grinding station with such teeth precisely located in such station.

Another object is to provide means for positioning the teeth of a saw in a grinding station of a grinding machine characterized by an extremely consistent mode of operation, resulting in all the teeth of a saw being exactly positioned prior to a grinding operation being performed thereon.

A further object of the invention is to provide means for positioning the teeth of a saw in a grinding station which will reliably handle saws of different sizes, and saws having different teeth configurations.

A grinding machine as contemplated can be utilized in the precision grinding of a wide variety of saw sizes and saw designs. Adjustments which may be required when setting up the grinding machine for a different type of saw are minimal. When adjustments are required, they are very readily made.

The positioning means contemplated, when incorporated in a grinding machine, enables the machine to be used in the substantially automatic grinding of all teeth of the saw. The positioning means contemplated may be incorporated with grinding machines affording grinding performed optionally either automatically or manually.

These and other objects and advantages are attained by the invention, which is described hereinbelow in conjunction with the accompanying drawings, wherein.

In co-pending application entitled "Grinding Machine" having Ser. No. 740,835 filed Nov. 11, 1976, there is disclosed a grinding machine adapted for the grinding of successive teeth in a circular saw. The grinding machine includes first and second grinding wheel means, each grinding wheel means including a grinding wheel, and the first and second grinding wheel means being mounted with their grinding wheels in opposed relation on opposite sides of a tooth positioned for grinding. With operation of the machines, these grinding wheels move across opposite side faces of a carbide tip which is part of the tooth in the saw. The grinding machine, therefore, constitutes what is referred to commonly as a dual side saw tooth grinding machine.

Figure 1:
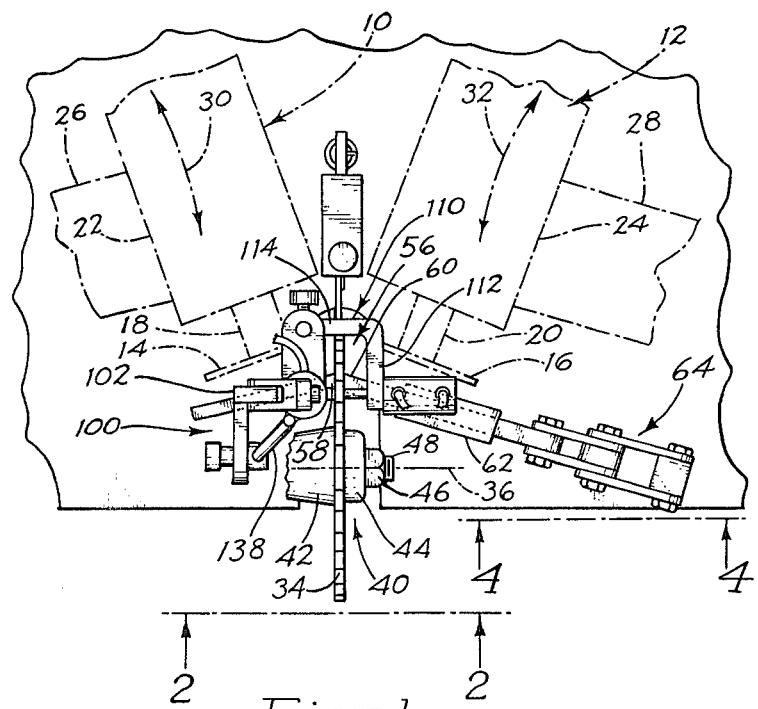
FIG. 1 is a top plan view of portions of a grinding machine equipped with saw positioning means as contemplated.

In FIG. 1 there is shown portions of a grinding machine of the type described in the above-identified application. More specifically, illustrated in dashed outline at 10 and 12 are first and second grinding wheel means. Each grinding wheel means includes a grinding wheel, shown at 14 for means 10 and at 16 for means 12. Each grinding wheel is mounted on a grinding wheel arbor, shown at 18 and 20, and each arbor is rotated under power by motor, shown at 22 and 24. Motor 22, through its casing, is secured to an arm 26 which underlies the motor, and motor 24, through its casing, is secured to an arm 28.

Arms 26, 28, as is fully discussed in the co-pending application, are pivotally mounted in the grinding machine whereby their free ends which support the motors 22, 24 are swingable in arcuate paths as indicated by double-ended arrows 30, 32. With upward swinging of the arms from the position shown in FIG. 1, grinding wheels 14, 16 are moved so that their edges move radially beyond and to one side of a circular saw mounted in the grinding machine, examplified by saw 34. Movement of the arms in the opposite direction causes the edges of the grinding wheels to move toward and across the side faces of a tip in any tooth which is in the path of such grinding wheels, thereby to grind such opposite faces simultaneously. In operation of the grinding machine, the procedure which is followed is first to position a tooth in the saw in the grinding station in the machine, with such precisely located in such station. Grinding wheel means 10 and 12 are then actuated with downward and then upward movement of the arms 26, 28 as such are seen in FIG. 1, whereby the grinding wheels 14, 16 moves across opposite side faces of the tip of the tooth in the grinding station and then return to a cleared position. The operator of the machine then rotates saw 34 about its axis, shown at 36, to advance a succeeding tooth into the grinding station. With such properly located, the grinding wheel means are again actuated to move the edges of the grinding wheels 14, 16 inwardly and across the side faces of the tip now in the grinding station and then to move these grinding wheels to a cleared position. This operation is repeated until all the teeth in the saw have been so ground.

As is also described in my co-pending application, a saw such as saw 34 during the grinding thereof is held in a holding means, partially illustrated at 40. Such holding means includes a truncated cone element 42 and washer, nut and screw 44, 46, 48, respectively. The assembly is rotatably mounted in the grinding machine with rotation being about axis 36 which is the axis of the saw.

Figure 4:
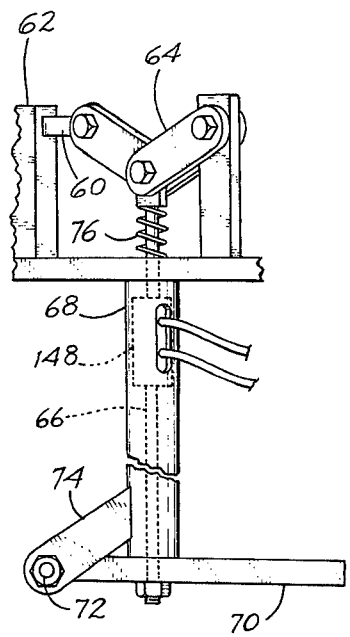
FIG. 4 is a side elevation of a portion of the machine illustrated in FIG. 1 taken along the line 4—4 in FIG. 1.

During grinding of a tooth, the saw is firmly clamped in place in a stationary position by a clamp mechanism indicated at 56. Such includes a bar 58 which is anchored in place in the grinding machine and which has a flat face presented against the left side of saw 34 in FIG. 1. Coacting with this bar is a clamp rod 60 on the opposite side of the saw from the bar. The clamp rod is slidably mounted in a guide block 62 secured to the frame of the machine, and connected to the clamp rod is toggle link mechanism 64. With reference now to FIGS. 1 and 4, a rod assembly 66 extending from the toggle link mechanism and through a sleeve 68 which is secured to the frame of the machine is shifted downwardly in FIG. 4 by depressing a foot lever 70 pivoted at 72 to a lug 74 which is an integral part of the sleeve. With depression of the foot lever, rod assembly 66 is moved downwardly to collapse the toggle link mechanism, which has the affect of withdrawing clamp rod 60 whereby it shifts away from the saw. With release of the foot lever, compression spring 76 urges mid-portions of the toggle link mechanism upwardly to return clamp rod 60 against the face of the saw, with the saw now being clamped between the clamp rod and bar 58.

A grinding machine as above generally described is essentially shown in my co-pending above referred to application, and reference may be made thereto for a more complete description of the mechanism just discussed. Suffice it to say, and for the purposes of this application, the grinding machine includes the opposed grinding wheel means in the form of wheel means 10 and 12, holding means 40 effective to hold the saw with such rotatable to advance successive teeth into the grinding station of the machine, and clamp mechanism exemplified by mechanism 56 which is actuatable to release the saw and to clamp onto the saw, with the saw when clamped being held firmly and being prevented from rotating about the axis afforded by holding means 40.

Figure 3:
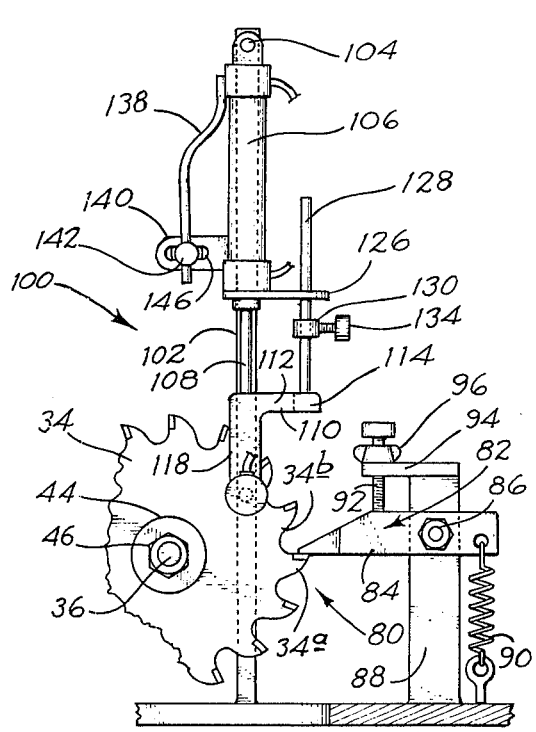
FIG. 3 is a side elevation of the apparatus shown in FIG. 2 taken generally along the line 3—3 in FIG. 2.

Referring to FIG. 3, the tooth of saw 34 which is to be ground is indexed, or positioned, in grinding station 80 by means of an indexing device 82. As illustrated, the indexing device takes the form of a pivoted indexing finger 84 pivotally supported at 86 on the upper extremity of post 88 secured to the frame of the machine. Coil spring 90 interposed between the end of the finger and the frame biases the right end of the finger in the drawing downwardly, to urge the left end upwardly against a stop screw 92. The stop screw is threadably received within an accommodating threaded bore passing through shelf 94 joined to the top of the post. Wing nut 96 is used firmly to tighten the stop screw in a given adjusted position.

In using the grinding machine, a tooth is positioned for sharpening when positioned as is tooth 34a in FIG. 3, with the front face of the tip in the tooth against the under side of the indexing finger and the finger abutting stop screw 92. After the tooth has been sharpened, a succeeding tooth, as exemplified by tooth 34b, is placed in the sharpening station by rotating the saw sufficiently to move tooth 34b downwardly and beyond the indexing finger. During such movement, the end of the finger or member rides against the perimeter of the saw, more specifically the back of tooth 34b, while swinging downwardly and away from axis 36 of the saw, to permit the tooth to pass beyond it. On the tooth passing beyond the pivoted member, the member swings under the urging of the spring backwardly to the position shown. The saw is then rotated in a counterclockwise direction slightly, to bring the new tooth, i.e. tooth 34b, back up against the under side of the idexing finger whereby it occupies the position of tooth 34a as shown in FIG. 3.

As discussed in my co-pending application, holding means 40 is mounted in such a manner as to permit it to be adjustably positioned both horizontally and vertically in FIG. 3. In this way, different diameters of saws and different hook angles in the saws are accommodated. Adjustment of stop screw 92 and the at-rest position of the indexing finger permits adjustments to be made in the orientation of the tip of a tooth with respect to the grinding wheels which produce the grind.

Indicated generally at 100 is saw-advancing means which is actuatable to rotate the saw in increments, whereby succeeding teeth are placed in the grinding station in a position for grinding operation as just described.

Considering now details of the saw-advancing means 100, a post 102 secured at its bottom end to the frame of the machine pivotally supports at 104 the non-extensible end of a fluid operated ram 106. The rod or extensible end 108 of this ram is secured to a yoke member 110 having arm 112 and a back expanse 114. Viewed in plan, arms 112 straddle saw 34. Depending from the distal ends of the arms and an integral part of the arms are depending reaches 116, 118, also straddling the saw.

Figure 2:
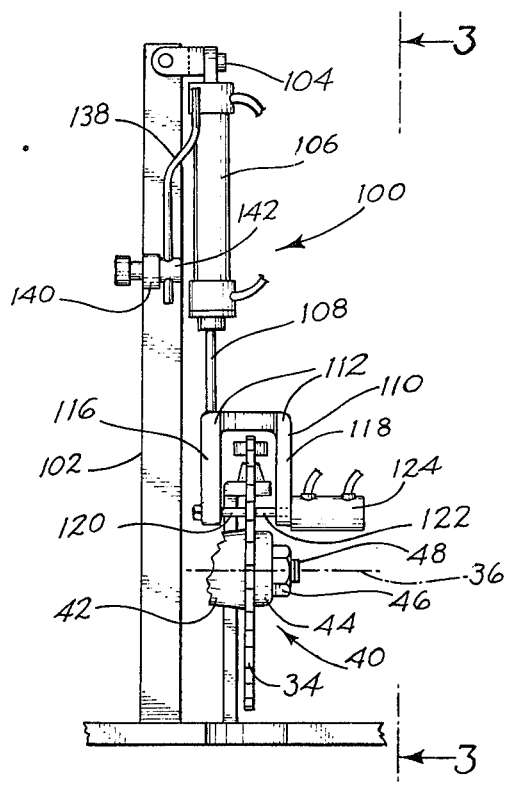
FIG. 2 is a side elevation of portions of the machine shown in FIG. 1 taken generally along the line 2—2 in FIG. 1.

Mounted at the lower end of reach 116, and with its inner end at the plane of the left face of the saw in FIG. 2, is a saw abutment member 120. Opposite abutment 120 is the extensible or rod end 122 of a fluid operated ram 124 having its cylinder end secured to the bottom end of reach 118. With extension of rod 122 by actuation of the ram, the saw becomes clamped between the rod end and saw abutment member 120. The ram and the abutment member, therefore, constitute another clamp mechanism in the grinding machine for clamping onto the saw.

Secured to the base of the cylinder in ram 106 is a platform 126. A rod 128 with its bottom end joined to back expanse 114 of the yoke member extends upwardly through an accommodating bore provided in platform 126. Collar 130 is adjustably positioned on rod 128, with screw 134 being provided for securing the collar in any given adjusted position. The rod restrains rod 108 from rotating, and the collar on the rod provide a means for limiting the retraction stroke in the ram.

A spring 138 with its upper end joined to the cylinder of ram 106 has its lower end adjacent an ear 140 joined to post 102. Adjustable anchor device 142 is used to anchor the lower end of the spring to the ear at any of various positions defined within slot 146 through which the anchor device extends.

In setting up the saw-advancing means described, collar 130 is secured in position on rod 28, whereby with the ram 124 contracted to the extent defined by this collar, abutment member 120 and rod 122 of the clamp mechanism will locate themselves in a region somewhat radially inwardly of the gullets of the particular saw being sharpened. Anchoring device 142 is positioned to produce the proper attitude in ram 124 (with the clamp mechanism comprising rod 122 and member 120 released).

Describing now the operation of the apparatus disclosed, a circular saw to be sharpened is mounted on holding means 40 and necessary adjustments made for the diameter and type of saw, whereby a tooth in a saw on coming up against the under side of the indexing finger as shown in FIG. 3 is in proper position for grinding. Adjustments are made in the advancing means 100 whereby with the ram 124 retracted, the clamp mechanism formed by abutment member 102 and rod 122, when actuated, will grip the saw in the region somewhat inwardly from the gullets thereon.

To advance a tooth into the grinding station, clamp mechanism 56 is released and ram 124 is extended to actuate the clamp mechanism comprising rod 122 and member 120. To rotate the saw, ram 106 is extended, causing the saw to be rotated in a clockwise direction in FIG. 3, with the tooth shown above the indexing finger moving down across the finger, the finger pivoting away from the axis of the saw to permit this tooth to pass beyond it. On the tooth passing beyond the indexing finger, the finger swings back to the horizontal position shown under the biasing of spring 90.

The control circuit for the hydraulic system may include a micro-switch which senses the return of the indexing finger to its horizontal position. When this occurs, the supply and exhaust of pressure fluid to ram 106 is reversed, causing the ram to be contracted. This moves the saw in a counterclockwise direction, to move the tooth which has just advanced beyond the indexing finger in a counterclockwise direction, whereby it comes up against the under side of indexing finger. It is preferred that the pressure fluid in ram 124 be considerably higher than the pressure of fluid in ram 106 so that with the newly positioned tooth on the under side of the finger, the clamp mechanism comprising rod 122 and member 120 does not slide over the saw faces, but instead holds ram 106 partially extended against the pressure of fluid tending to urge contraction.

Clamp mechanism 56 is then actuated (by releasing foot lever 70) with the saw then being clamped by bar 58 and clamp rod 60 to prepare it for grinding. Clamp mechanism comprising rod 122 and member 120 is released to permit full contraction of ram 106 to the extent permitted by collar 130. The tooth is now in condition for a grinding operation to be performed.

If desired, instead of using the foot lever to actuate clamp mechanism 56, a ram such as that shown at 148 may be provided in rod assembly 66 which is effective upon being actuated to produce effective contraction of the length of the rod assembly. This produces release of clamp mechanism 56 in the same manner as if foot lever 70 is depressed.

It will be noted that with the clamp mechanism comprising rod 122 and member 120 actuated to clamp onto the saw, and with extension of ram 106 to produce rotaton of the saw, the clamp mechanism will move in an arcuate path as the saw rotates about axis 36. This arcuate movement is accommodated by the pivot mounting of the non-extensible end of ram 106, and resisted by spring 138. With the saw rotated to place a tooth beyond the indexing finger and then partially retracted, the cylinder in ram 106 will have a position wherein its bottom end is more to the right of its top end than in its original starting position. With release of the clamp mechanism comprising rod 122 and member 120, and on full retraction of ram 106, spring 138 returns its cylinder to the position desired.

If desired, another collar similar to collar 130 may be mounted on rod 128 above platform 126, which would be effective to limit extension of ram 124, instead of using a micro-switch controlled by the indexing finger. In this type of installation, ram 106 extends to the extent permitted by this additional collar (this extension being sufficient to move a succeeding tooth past the indexing finger). The ram is then contracted to bring the just-advanced tooth up underneath the indexing finger to place the tooth as shown in FIG. 3.

It should be apparent that the mechanism provided for positioning successive teeth of the saw in the grinding station in a precisely determined position is flexible, in that a large variety of saws may be handled. Once the grinding machine has been set up, its operation is consistent and reliable. Whatever the hook angle, diameter, or configuration of the saw, once the machine has been set up, each successive tooth will have, when occupying the grinding station, precisely the position of a preceding tooth. This, of course, is important in obtaining a uniformly ground saw with a smooth cutting characteristic.

Variations and modifications of the invention will suggest themselves to those skilled in the art.

It is claimed and desired to secure by Letters Patent:

1. In a grinding machine for grinding the teeth in a circular saw, a frame,
   holding means mounted on said frame for holding the saw at the eye region thereof with the saw rotatable about its axis,
   an indexing device mounted on said frame spaced radially from the axis of a saw so held adapted to have a tooth of the saw rest thereagainst thus to position the saw tooth for grinding,
   first clamp mechanism mounted on said frame for clamping a saw held by said holding means, and
   saw-advancing means for rotating in increments a saw held by said holding means thus to place successive teeth in a position resting against said indexing means,
   said saw advancing means comprising a second clamp mechanism spaced from the first clamp mechanism for clamping onto opposite bases of the saw at a location spaced radially from the axis of the saw,
   said second clamp mechanism on being clamped onto a saw and on rotation of the saw riding with the saw in an arcuate path spaced radially from said axis of the saw
   and power-operated means operatively interposed between said frame and said second clamp mechanism for imparting movement to said clamp mechanism in said arcuate path and with such movement rotational movement to the saw.

2. The grinding machine of claim 1, wherein said indexing device comprises a pivoted member which rides against the periphery of the saw and pivotally swings away from the axis of a saw on a tooth in the saw moving in one direction thereby, and a stop for said pivoted member limiting return pivotal movement of the member on a tooth moving beyond the member.

3. The grinding machine of claim 1, wherein said power-operated means comprises an extensible ram having an extensible end operatively connected to said second clamp mechanism and pivotally mounted on said frame at a nonextensible portion thereof.

4. The grinding machine of claim 3, which includes biasing means prepositioning the ram with the second clamp mechanism released from a saw.

5. In a grinding machine for grinding the teeth in a circular saw, a frame,
   holding means mounted on said frame for holding the saw at an eye region thereof with the saw rotatable about its axis,
   a movable indexing device mounted on said frame having one position where the device fits within a gullet and against the face of a tooth in a saw held by said holding means and being movable from said one position away from the axis of the saw so held to accommodate the movement of a saw tooth thereby, and
   saw-advancing means for rotating a saw held in said holding means to advance at least one tooth past said indexing device, said saw advancing means comprising releasable clamp mechanism for clamping onto opposite faces of a saw held by said holding means at a location spaced radially from the axis of the saw,
   said clamp mechanism on being clamped onto a saw and on rotation of the saw riding with the saw in an arcuate path spaced radially from said axis of the saw,
   said advancing means further including power-operated means operatively interposed between said frame and said clamp mechanism for imparting movement to said clamp mechanism in said arcuate path and with such movement rotational movement of the saw.

6. The grinding machine of claim 5, wherein said power-operated means comprises an extensible ram having an extensible end operatively connected to said clamp mechanism and pivotally mounted at a nonextensible portion thereof to accommodate the arcuate movement of the clamp mechanism.

7. The grinding machine of claim 6, which includes biasing means prepositioning the ram with the clamp mechanism released from the saw.

* * * * *